US012621755B2

(12) United States Patent
Thiebaut et al.

(10) Patent No.: US 12,621,755 B2
(45) Date of Patent: May 5, 2026

(54) METHOD, APPARATUS, AND COMPUTER PROGRAM PRODUCT TO SUPPORT MULTIPLE SLICES IN CASE OF OVERLAYUNDERLAY NETWORKING

(71) Applicant: NOKIA TECHNOLOGIES OY, Espoo (FI)

(72) Inventors: Laurent Thiebaut, Antony (FR); Devaki Chandramouli, Plano, TX (US); György Wolfner, Budapest (HU); Hannu Petri Hietalahti, Kiviniemi (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 247 days.

(21) Appl. No.: 18/247,609

(22) PCT Filed: Sep. 14, 2021

(86) PCT No.: PCT/EP2021/075149
§ 371 (c)(1),
(2) Date: Mar. 31, 2023

(87) PCT Pub. No.: WO2022/069205
PCT Pub. Date: Apr. 7, 2022

(65) Prior Publication Data
US 2024/0023007 A1     Jan. 18, 2024

Related U.S. Application Data

(60) Provisional application No. 63/087,043, filed on Oct. 2, 2020.

(51) Int. Cl.
*H04W 48/16*        (2009.01)
*H04W 60/00*        (2009.01)

(52) U.S. Cl.
CPC .......... *H04W 48/16* (2013.01); *H04W 60/00* (2013.01)

(58) Field of Classification Search
None
See application file for complete search history.

(56) References Cited

U.S. PATENT DOCUMENTS

2018/0317163 A1    11/2018  Lee et al.
2019/0349951 A1*   11/2019  Ahmad .................. H04W 76/14
(Continued)

FOREIGN PATENT DOCUMENTS

CN        108347751 A      7/2018
CN        109905887 A      6/2019
(Continued)

OTHER PUBLICATIONS

"3rd Generation Partnership Project; Technical Specification Group Core Network and Terminals; Non-Access-Stratum (NAS) protocol for 5G System (5GS); Stage 3; (Release 16)", 3GPP TS 24.501 v16.5.1, (Jul. 2020).
(Continued)

*Primary Examiner* — German Viana Di Prisco
(74) *Attorney, Agent, or Firm* — ALSTON & BIRD LLP

(57) ABSTRACT

A method, apparatus, and computer program product are provided for supporting the identification and selection of multiple network slices for remote user equipment. In the context of a method, the method includes receiving a first request from a remote user device, the request comprising a network identifier and requested slice information. The method also includes, based at least on the network identifier and the requested slice information, obtaining a slice identifier set comprising at least one slice identifier, and causing transmission of the slice identifier set to the remote user device for use in a session.

18 Claims, 10 Drawing Sheets

Underlay network (Relay UE)          Overlay network (Remote UE)

Remote UE — Relay UE — NG RAN — 5GC Relay — UPF (relay UE) — N3IWF — 5GC Remote — UPF (remote UE)
PC5        Uu                                  N6

(56)                    References Cited

U.S. PATENT DOCUMENTS

| | | | |
|---|---|---|---|
| 2020/0163010 A1 | 5/2020 | Qiao et al. | |
| 2020/0383031 A1 | 12/2020 | Gu et al. | |
| 2020/0396674 A1 | 12/2020 | Yuan et al. | |
| 2021/0321264 A1 | 10/2021 | Lou et al. | |
| 2022/0264442 A1 | 8/2022 | Yang et al. | |
| 2022/0286895 A1* | 9/2022 | Lee | H04W 28/0257 |
| 2022/0369215 A1* | 11/2022 | Dees | H04W 76/14 |
| 2023/0199550 A1* | 6/2023 | Xing | H04W 28/0257 |
| | | | 370/329 |
| 2023/0309004 A1* | 9/2023 | Wei | H04W 48/16 |
| 2023/0319549 A1* | 10/2023 | Dees | H04W 12/06 |
| | | | 455/410 |

FOREIGN PATENT DOCUMENTS

| | | | |
|---|---|---|---|
| CN | 110213066 A | 9/2019 | |
| EP | 3 780 804 A1 | 2/2021 | |
| WO | WO 2019/205027 A1 | 10/2019 | |
| WO | WO 2020/093247 A1 | 5/2020 | |
| WO | WO 2021/230867 A1 | 11/2021 | |

OTHER PUBLICATIONS

"3rd Generation Partnership Project; Technical Specification Group Services and System Aspects; Architecture enhancements for 5G System (5GS) to support Vehicle-to-Everything (V2X) services (Release 16)", 3GPP TS 23.287 v16.3.0, (Jul. 2020), 57 pages.

"3rd Generation Partnership Project; Technical Specification Group Services and System Aspects; Procedures for the 5G System (5GS); Stage 2 (Release 16)", 3GPP TS 23.502 v16.5.0, (Jul. 2020), 594 pages.

"3rd Generation Partnership Project; Technical Specification Group Services and System Aspects; Study on system enhancement for Proximity based Services (ProSe) in the 5G System (5GS) (Release 17)", 3GPP TR 23.752 v0.4.0, (Jun. 2020), 121 pages.

"3rd Generation Partnership Project; Technical Specification Group Services and System Aspects; System architecture for the 5G System (5GS); Stage 2 (Release 16)", 3GPP TS 23.501 v16.5.0, (Jul. 2020), 441 pages.

Ericsson, "Solution for selection of a network slice instance with initial bootstrap", SA WG2 Meeting #114, S2-161481, (Apr. 11-15, 2016), 4 pages.

First Examination Report for Indian Application No. 202347030021 dated Feb. 8, 2024, 6 pages.

Interdigital Inc., "KI #3, Sol #28: Update to remove ENs", SA WG2 Meeting #52-140E, S2-2006572, (Aug. 19-Sep. 2, 2020), 3 pages.

International Search Report and Written Opinion for Patent Cooperation Treaty Application No. PCT/EP2021/075149 dated Mar. 30, 2022, 27 pages.

Office Action for Japanese Application No. 2023-520094 dated Apr. 15, 2024, 8 pages.

Philips International B.V., "UE-to-Network Relay discovery and handling of PDU session parameters with Remote UE based relay selection.", SA WG2 Meeting #139e, S2-2004202, (Jun. 1-12, 2020), 7 pages.

Samsung, "KI#3, New Sol: Network Controlled Remote UE authorization for UE-to-Network Relay", SA WG2 Meeting #140E (e-meeting), S2-2006556, (Aug. 19-Sep. 2, 2020), 5 pages.

Office Action for European Application No. 21777681.4 dated Jul. 3, 2024, 6 pages.

Office Action for Chinese Application No. 202180081456.3 dated Jun. 13, 2025, 19 pages.

* cited by examiner

500

501

Receive a first request from a remote user device, the request comprising a network identifier and requested slice information

502

Based at least on the PLMN identifier and the requested NSSAI, obtain a S-NSSAI set comprising at least one S-NSSAI To FIG. 6 or FIG. 7

503

Cause transmission of the slice identifier set to the remote user device for use in a session

METHOD, APPARATUS, AND COMPUTER PROGRAM PRODUCT TO SUPPORT MULTIPLE SLICES IN CASE OF OVERLAYUNDERLAY NETWORKING

CROSS-REFERENCE TO RELATED APPLICATIONS

This application is a national phase entry of International Application No. PCT/EP2021/075149, filed Sep. 14, 2021, which claims benefit of U.S. Provisional Application No. 63/087,043, filed Oct. 2, 2020, the contents of which are hereby incorporated by reference in their entirety.

TECHNOLOGICAL FIELD

An example embodiment relates generally to supporting the identification and selection of multiple network slices for remote user equipment.

BACKGROUND

A communication system can be seen as a facility that enables communication sessions between two or more entities such as user equipment (UE), base stations/access points, Network Functions (NF), and/or other nodes by providing connectivity between the various entities involved in the communication path. A communication system can be provided, for example, by means of a communication network and one or more compatible communication devices. Telecommunication networks, such as the fifth generation of mobile networks (5G networks) are expected to be the next major phase of mobile telecommunication standards and to bring many improvements in the mobile network user experience. For instance, 5G networks should provide new technical solutions allowing a greater throughput, lower latency, higher reliability, higher connectivity, and higher mobility range. In addition to these improvements in terms of performance, 5G networks are also expected to extend the flexibility in the network usage and to provide users with a wider range of use cases and business models.

The 3rd Generation Partnership Project (3GPP) is a standards organization which develops protocols for mobile telephony and is known for the development and maintenance of various standards including second generation (2G), third generation (3G), fourth generation (4G), Long Term Evolution (LTE), and fifth generation (5G) standards. The 5G network has been designed as a Service Based Architecture (SBA), e.g., a system architecture in which the system functionality is achieved by a set of NFs providing services to other authorized NFs to access their services. The 5G network system allows for the support of network slices, which are end to end logical networks which support a certain set of NFs. In other words, a network slice is a logical network that provides specific network capabilities and network characteristics. Across a 5G network, comprising a plurality of network slices, particular network slices can be configured to support particular features (e.g., hardware specifications, NFs, domain access, etc.) not common to all network slices. User equipment can be configured to access multiple network slices over the same access point.

Identification of a network slice is done via Single Network Slice Selection Assistance Information (S-NSSAI) which is sent to the user equipment via signaling messages between the user equipment and the connected network. The Network Slice Selection Assistance Information (NSSAI) is a collection of S-NSSAIs sent to the user equipment via signaling messages between the user equipment and the connected network. A single user equipment can be served by multiple network slices at a time. The S-NSSAI signaled by the user equipment to the network, assists the network in selecting a particular network slice instance. The network slice instance is a set of NF instances and their required resources (e.g., computing, processing, storage, networking, etc.) which form a deployed network slice. The S-NSSAI is associated with a Public Land Mobile Network (PLMN), for example, the S-NSSAI is configured to indicate an associated PLMN identification code, or other ID information, having network-specific values or standard global values. An S-NSSAI is used by the user equipment for selecting and accessing the PLMN that the S-NSSAI is associated with.

BRIEF SUMMARY

In an embodiment, an apparatus is provided. The apparatus includes at least one processor and at least one memory including computer program code, the at least one memory and the computer program code configured to, with the at least one processor, cause the apparatus to receive a first request from a remote user device, the request comprising a network identifier and requested slice information. The at least one memory and the computer program code are also configured to, with the at least one processor, cause the apparatus to, based at least on the network identifier and the requested slice information, obtain a slice identifier set comprising at least one slice identifier. The at least one memory and the computer program code are also configured to, with the at least one processor, cause the apparatus to cause transmission of the slice identifier set to the remote user device for use over a relay session.

In some embodiments, the at least one memory and the computer program code that are configured to, with the at least one processor, cause the apparatus to obtain the slice identifier set are further configured to cause transmission of a second request to an Access and Mobility Management Function (AMF), the second request comprising the network identifier and the requested slice information, and receive the slice identifier set from the AMF with the slice identifier set being determined based at least on the network identifier and the requested slice information.

In some embodiments, the second request comprises a Packet Data Unit (PDU) session establishment request, and receiving the slice identifier set from the AMF comprises receiving the slice identifier set as part of a PDU session acceptance message.

In some embodiments, the second request comprises a Packet Data Unit (PDU) session modification request, and receiving the slice identifier set from the AMF comprises receiving the slice identifier set as part of a PDU session modification acceptance message.

In some embodiments, the second request comprises a dedicated Non-Access Stratum (NAS) message requesting authorization for relaying traffic of the remote user device.

In some embodiments, the at least one memory and the computer program code are further configured to, with the at least one processor, cause the apparatus to receive the slice identifier set and a slice identifier to be used to determine the Packet Data Unit (PDU) session to relay the traffic of the remote user device.

In some embodiments, determining the PDU session comprises one of a usage of an already established PDU session for the slice identifier, a request for modification of the already established PDU session for the slice identifier, or a request for establishment of the PDU session.

In some embodiments, the at least one memory and the computer program code that are configured to, with the at least one processor, cause the apparatus to obtain the slice identifier set are further configured to determine the slice identifier set based at least on one or more parameters comprising one or more slice mapping rules.

In some embodiments, the one or more parameters further comprises at least one of the requested slice information and capabilities of an associated access network. In some embodiments, the slice mapping rules are received from a Policy Control Function (PCF).

In some embodiments, the at least one memory and the computer program code are further configured to, with the at least one processor, cause the apparatus to trigger establishment of a PDU session in accordance with the one or more parameters.

In some embodiments, the at least one memory and the computer program code are further configured to, with the at least one processor, cause the apparatus to trigger modification of a PDU session in accordance with the one or more parameters.

In another embodiment, an apparatus is provided. The apparatus comprises means for receiving a first request from a remote user device, the request comprising a network identifier and requested slice information. The apparatus also comprises means for, based at least on the network identifier and the requested slice information, obtaining a slice identifier set comprising at least one slice identifier. The apparatus also comprises means for causing transmission of the slice identifier set to the remote user device for use over a relay session.

In some embodiments, the means for obtaining the slice identifier set further comprise means for causing transmission of a second request to an Access and Mobility Management Function (AMF), the second request comprising the network identifier and the requested slice information, and means for receiving the slice identifier set from the AMF with the slice identifier set being determined based at least on the network identifier and the requested slice information.

In some embodiments, the second request comprises a Packet Data Unit (PDU) session establishment request, and the means for receiving the slice identifier set from the AMF comprises means for receiving the slice identifier set as part of a PDU session acceptance message.

In some embodiments, the second request comprises a Packet Data Unit (PDU) session modification request, and wherein the means for receiving the slice identifier set from the AMF comprises means for receiving the slice identifier set as part of a PDU session modification acceptance message.

In some embodiments, the second request comprises a dedicated Non-Access Stratum (NAS) message requesting authorization for relaying traffic of the remote user device.

In some embodiments, the apparatus further comprises means for receiving the slice identifier set and a slice identifier to be used to determine the Packet Data Unit (PDU) session to relay the traffic of the remote user device.

In some embodiments, determining the PDU session comprises one of a usage of an already established PDU session for the slice identifier, a request for modification of the already established PDU session for the slice identifier, or a request for establishment of the PDU session.

In some embodiments, the means for obtaining the slice identifier set further comprise means for determining the slice identifier set based at least on one or more parameters comprising one or more slice mapping rules.

In some embodiments, the one or more parameters further comprises at least one of the requested slice information and capabilities of an associated access network. In some embodiments, the slice mapping rules are received from a Policy Control Function (PCF). In some embodiments, the apparatus further comprises means for triggering establishment of a PDU session in accordance with the one or more parameters. In some embodiments, the apparatus further comprises means for triggering modification of a PDU session in accordance with the one or more parameters.

In another embodiment, a method is provided. The method includes receiving a first request from a remote user device, the request comprising a network identifier and requested slice information. The method also includes based at least on the network identifier and the requested slice information, obtaining a slice identifier set comprising at least one slice identifier. The method also includes causing transmission of the slice identifier set to the remote user device for use over a relay session.

In some embodiments of the method, obtaining the slice identifier set further comprises causing transmission of a second request to an Access and Mobility Management Function (AMF), the second request comprising the network identifier and the requested slice information, and receiving the slice identifier set from the AMF with the slice identifier set being determined based at least on the network identifier and the requested slice information. In some embodiments of the method, the second request comprises a Packet Data Unit (PDU) session establishment request, and receiving the slice identifier set from the AMF comprises receiving the slice identifier set as part of a PDU session acceptance message.

In some embodiments of the method, the second request comprises a Packet Data Unit (PDU) session modification request, and receiving the slice identifier set from the AMF comprises receiving the slice identifier set as part of a PDU session modification acceptance message.

In some embodiments of the method, the second request comprises a dedicated Non-Access Stratum (NAS) message requesting authorization for relaying traffic of the remote user device.

In some embodiments of the method, the method further comprises receiving the slice identifier set and a slice identifier to be used to determine the Packet Data Unit (PDU) session to relay the traffic of the remote user device.

In some embodiments of the method, determining the PDU session comprises one of a usage of an already established PDU session for the slice identifier, a request for modification of the already established PDU session for the slice identifier, or a request for establishment of the PDU session.

In some embodiments of the method, obtaining the slice identifier set further comprises determining the slice identifier set based at least on one or more parameters comprising one or more slice mapping rules.

In some embodiments of the method, the one or more parameters further comprises at least one of the requested slice information and capabilities of an associated access network. In some embodiments of the method, the slice mapping rules are received from a Policy Control Function (PCF).

In some embodiments of the method, the method further comprises triggering establishment of a PDU session in accordance with the one or more parameters. In some embodiments of the method, the method further comprises triggering modification of a PDU session in accordance with the one or more parameters.

In another embodiment, an computer program product is provided. The computer program product includes a non-transitory computer readable storage medium having program code portions stored thereon, the program code portions configured, upon execution, to receive a first request from a remote user device, the request comprising a network identifier and requested slice information. The program code portions are also configured, upon execution, to, based at least on the network identifier and the requested slice information, obtain a slice identifier set comprising at least one slice identifier. The program code portions are also configured, upon execution, to cause transmission of the slice identifier set to the remote user device for use over a relay session.

In some embodiments, the program code portions that are configured to obtain the slice identifier set are further configured to cause transmission of a second request to an Access and Mobility Management Function (AMF), the second request comprising the network identifier and the requested slice information, and receive the slice identifier set from the AMF with the slice identifier set being determined based at least on the network identifier and the requested slice information.

In some embodiments, the second request comprises a Packet Data Unit (PDU) session establishment request, and receiving the slice identifier set from the AMF comprises receiving the slice identifier set as part of a PDU session acceptance message.

In some embodiments, the second request comprises a Packet Data Unit (PDU) session modification request, and receiving the slice identifier set from the AMF comprises receiving the slice identifier set as part of a PDU session modification acceptance message.

In some embodiments, the second request comprises a dedicated Non-Access Stratum (NAS) message requesting authorization for relaying traffic of the remote user device.

In some embodiments, the program code portions are further configured, upon execution, to receive the slice identifier set and a slice identifier to be used to determine the Packet Data Unit (PDU) session to relay the traffic of the remote user device.

In some embodiments, determining the PDU session comprises one of a usage of an already established PDU session for the slice identifier, a request for modification of the already established PDU session for the slice identifier, or a request for establishment of the PDU session.

In some embodiments, the program code portions that are configured to cause the apparatus to obtain the slice identifier set are further configured to determine the slice identifier set based at least on one or more parameters comprising one or more slice mapping rules.

In some embodiments, the one or more parameters further comprises at least one of the requested slice information and capabilities of an associated access network. In some embodiments, the slice mapping rules are received from a Policy Control Function (PCF).

In some embodiments, the program code portions are further configured, upon execution, to trigger establishment of a PDU session in accordance with the one or more parameters.

In some embodiments, the program code portions are further configured, upon execution, to trigger modification of a PDU session in accordance with the one or more parameters.

In another embodiment, an apparatus is provided that includes at least one processor and at least one memory including computer program code. The at least one memory and the computer program code are configured to, with the at least one processor, cause the apparatus to, based on an internal determination of one or more required services from an overlay network, generate a first request comprising a network identifier and requested slice information. The at least one memory and the computer program code are also configured to, with the at least one processor, cause the apparatus to, based at least on the network identifier and the requested slice information, obtain a slice identifier set comprising at least one slice identifier.

In some embodiments, the at least one memory and the computer program code that are configured to, with the at least one processor, cause the apparatus to obtain the slice identifier set are further configured to determine the slice identifier set based at least on one or more parameters comprising one or more slice mapping rules.

In some embodiments, the at least one memory and the computer program code that are configured to, with the at least one processor, cause the apparatus to obtain the slice identifier set are further configured to cause transmission of the first request to an Access and Mobility Management Function (AMF), and receive the slice identifier set from the AMF with the slice identifier set being determined based at least on the network identifier and the requested slice information.

In another embodiment, an apparatus is provided that includes means for, based on an internal determination of one or more required services from an overlay network, generating a first request comprising a network identifier and requested slice information. The apparatus also includes means for, based at least on the network identifier and the requested slice information, obtaining a slice identifier set comprising at least one slice identifier.

In some embodiments, the means for obtaining the slice identifier set further comprise means for determining the slice identifier set based at least on one or more parameters comprising one or more slice mapping rules. In some embodiments, the means for obtaining the slice identifier set further comprise means for causing transmission of the first request to an Access and Mobility Management Function (AMF), and means for receiving the slice identifier set from the AMF with the slice identifier set being determined based at least on the network identifier and the requested slice information.

In another embodiment, a method is provided. The method includes, based on an internal determination of one or more required services from an overlay network, generating a first request comprising a network identifier and requested slice information. The method also includes, based at least on the network identifier and the requested slice information, obtaining a slice identifier set comprising at least one slice identifier.

In some embodiments, obtaining the slice identifier set further comprises determining the slice identifier set based at least on one or more parameters comprising one or more slice mapping rules.

In some embodiments, obtaining the slice identifier set further comprises causing transmission of the first request to an Access and Mobility Management Function (AMF) and receiving the slice identifier set from the AMF with the slice identifier set being determined based at least on the network identifier and the requested slice information.

In another embodiment, a computer program product is provided that includes a non-transitory computer readable storage medium having program code portions stored thereon, the program code portions being configured, upon execution, to, based on an internal determination of one or more required services from an overlay network, generate a first request comprising a network identifier and requested slice information. The program code portions are also configured, upon execution, to, based at least on the network identifier and the requested slice information, obtain a slice identifier set comprising at least one slice identifier.

In some embodiments, the program code portions that are configured to obtain the slice identifier set are further configured to determine the slice identifier set based at least on one or more parameters comprising one or more slice mapping rules.

In some embodiments, the program code portions that are configured to obtain the slice identifier set are further configured to obtain the slice identifier set are further configured to cause transmission of the first request to an Access and Mobility Management Function (AMF), and receive the slice identifier set from the AMF with the slice identifier set being determined based at least on the network identifier and the requested slice information.

In another embodiment, an apparatus is provided that includes at least one processor and at least one memory including computer program code, the at least one memory and the computer program code being configured to, with the at least one processor, cause the apparatus to cause transmission of a request to another user device, the request comprising a network identifier and requested slice information, and receive, from the user device, a slice identifier set. In some embodiments, the slice identifier set is used to generate a slice request to register to a network over a connection supported by the another user device.

In another embodiment, an apparatus is provided that includes means for causing transmission of a request to another user device, the request comprising a network identifier and requested slice information, and means for receiving, from the user device, a slice identifier set. In some embodiments, the slice identifier set is used to generate a slice request to register to a network over a connection supported by the another user device.

In another embodiment, a method is provided that includes causing transmission of a request to another user device, the request comprising a network identifier and requested slice information, and receiving, from the user device, a slice identifier set. In some embodiments, the slice identifier set is used to generate a slice request to register to a network over a connection supported by the another user device.

In another embodiment, a computer program product is provided that includes a non-transitory computer readable storage medium having program code portions stored thereon, the program code portions being configured, upon execution, to cause transmission of a request to another user device, the request comprising a network identifier and requested slice information, and receive, from the user device, a slice identifier set. In some embodiments, the slice identifier set is used to generate a slice request to register to a network over a connection supported by the another user device.

In another embodiment, an apparatus is provided that includes at least one processor and at least one memory including computer program code, the at least one memory and the computer program code configured to, with the at least one processor, cause the apparatus to receive, from a user device, a request comprising a network identifier and requested slice information of a remote user device, and cause transmission of a slice identifier set to the user device, the slice identifier set determined based at least on the network identifier and the requested slice information.

In some embodiments, the request comprises a Packet Data Unit (PDU) session establishment request, and wherein causing transmission of the slice identifier set comprises causing transmission of the slice identifier set as part of a PDU session acceptance message.

In some embodiments, the request comprises a Packet Data Unit (PDU) session modification request, and causing transmission of the slice identifier set comprises causing transmission of the slice identifier set as part of a PDU session modification acceptance message.

In some embodiments, the request comprises a dedicated Non-Access Stratum (NAS) message requesting authorization for relaying the remote user device.

In some embodiments, causing transmission of a slice identifier set to the user device comprises causing transmission of the slice identifier set together with a slice identifier within a dedicated Non-Access Stratum (NAS) message response granting authorization for relaying the remote user device.

In another embodiment, an apparatus is provided. The apparatus includes means for receiving, from a user device, a request comprising a network identifier and requested slice information of a remote user device, and means for causing transmission of a slice identifier set to the user device, the slice identifier set determined based at least on the network identifier and the requested slice information.

In some embodiments, the request comprises a Packet Data Unit (PDU) session establishment request, and the means for causing transmission of the slice identifier set comprise means for causing transmission of the slice identifier set as part of a PDU session acceptance message.

In some embodiments, the request comprises a Packet Data Unit (PDU) session modification request, and the means for causing transmission of the slice identifier set comprise means for causing transmission of the slice identifier set as part of a PDU session modification acceptance message.

In some embodiments, the request comprises a dedicated Non-Access Stratum (NAS) message requesting authorization for relaying the remote user device.

In some embodiments, the means for causing transmission of a slice identifier set to the user device comprises means for causing transmission of the slice identifier set together with a slice identifier within a dedicated Non-Access Stratum (NAS) message response granting authorization for relaying the remote user device.

In another embodiment, a method is provided that includes receiving, from a user device, a request comprising a network identifier and requested slice information of a remote user device, and causing transmission of a slice identifier set to the user device, the slice identifier set determined based at least on the network identifier and the requested slice information.

In some embodiments, the request comprises a Packet Data Unit (PDU) session establishment request, and wherein causing transmission of the slice identifier set comprises causing transmission of the slice identifier set as part of a PDU session acceptance message. In some embodiments, the request comprises a Packet Data Unit (PDU) session modification request, and causing transmission of the slice identifier set comprise causing transmission of the slice identifier set as part of a PDU session modification acceptance message. In some embodiments, the request comprises a dedicated Non-Access Stratum (NAS) message requesting authorization for relaying the remote user device.

In some embodiments, causing transmission of a slice identifier set to the user device comprises causing transmission of the slice identifier set together with a slice identifier within a dedicated Non-Access Stratum (NAS) message response granting authorization for relaying the remote user device.

In another embodiment, a computer program product is provided, the computer program product comprising a non-transitory computer readable storage medium having program code portions stored thereon, with the program code portions being configured, upon execution, to receive, from a user device, a request comprising a network identifier and requested slice information of a remote user device, and cause transmission of a slice identifier set to the user device, the slice identifier set determined based at least on the network identifier and the requested slice information.

In some embodiments, the request comprises a Packet Data Unit (PDU) session establishment request, and wherein causing transmission of the slice identifier set comprises causing transmission of the slice identifier set as part of a PDU session acceptance message.

In some embodiments, the request comprises a Packet Data Unit (PDU) session modification request, and causing transmission of the slice identifier set comprises causing transmission of the slice identifier set as part of a PDU session modification acceptance message.

In some embodiments, the request comprises a dedicated Non-Access Stratum (NAS) message requesting authorization for relaying the remote user device.

In some embodiments, causing transmission of a slice identifier set to the user device comprises causing transmission of the slice identifier set together with a slice identifier within a dedicated Non-Access Stratum (NAS) message response granting authorization for relaying the remote user device.

In another embodiment, an apparatus is provided that includes at least one processor and at least one memory including computer program code, the at least one memory and the computer program code being configured to, with the at least one processor, cause the apparatus to cause transmission of one or more slice mapping rules to a user device. In some embodiments, the apparatus is a Policy Control Function (PCF).

In another embodiment, an apparatus is provided that includes means for causing transmission of one or more slice mapping rules to a user device. In some embodiments, the apparatus is a Policy Control Function (PCF).

In another embodiment, a method is provided that includes causing, by an apparatus, transmission of one or more slice mapping rules to a user device. In some embodiments, the apparatus is a Policy Control Function (PCF).

In another embodiment, a computer program product is provided that includes a non-transitory computer readable storage medium having program code portions stored thereon, the program code portions configured, upon execution, to cause transmission of one or more slice mapping rules to a user device. In some embodiments, the apparatus is a Policy Control Function (PCF).

BRIEF DESCRIPTION OF THE DRAWINGS

Figure 1:
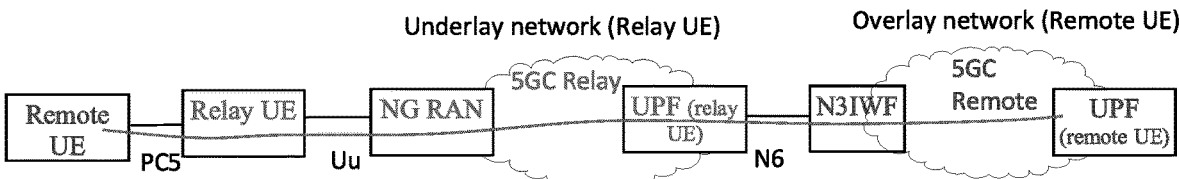
Figure 2:
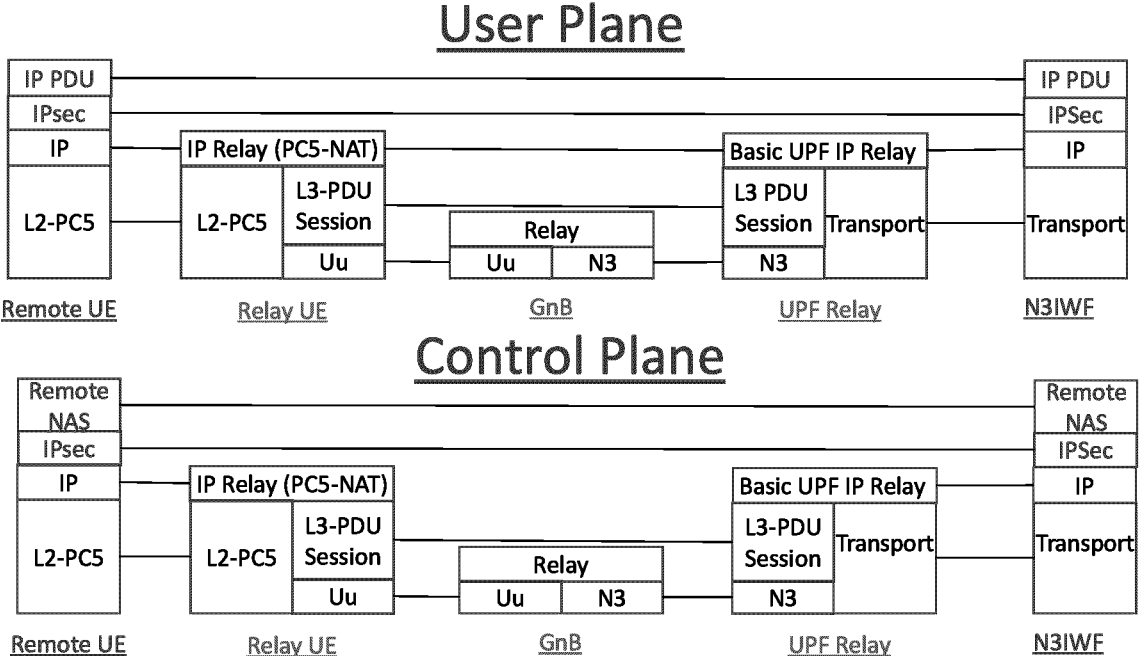
Figure 3A:
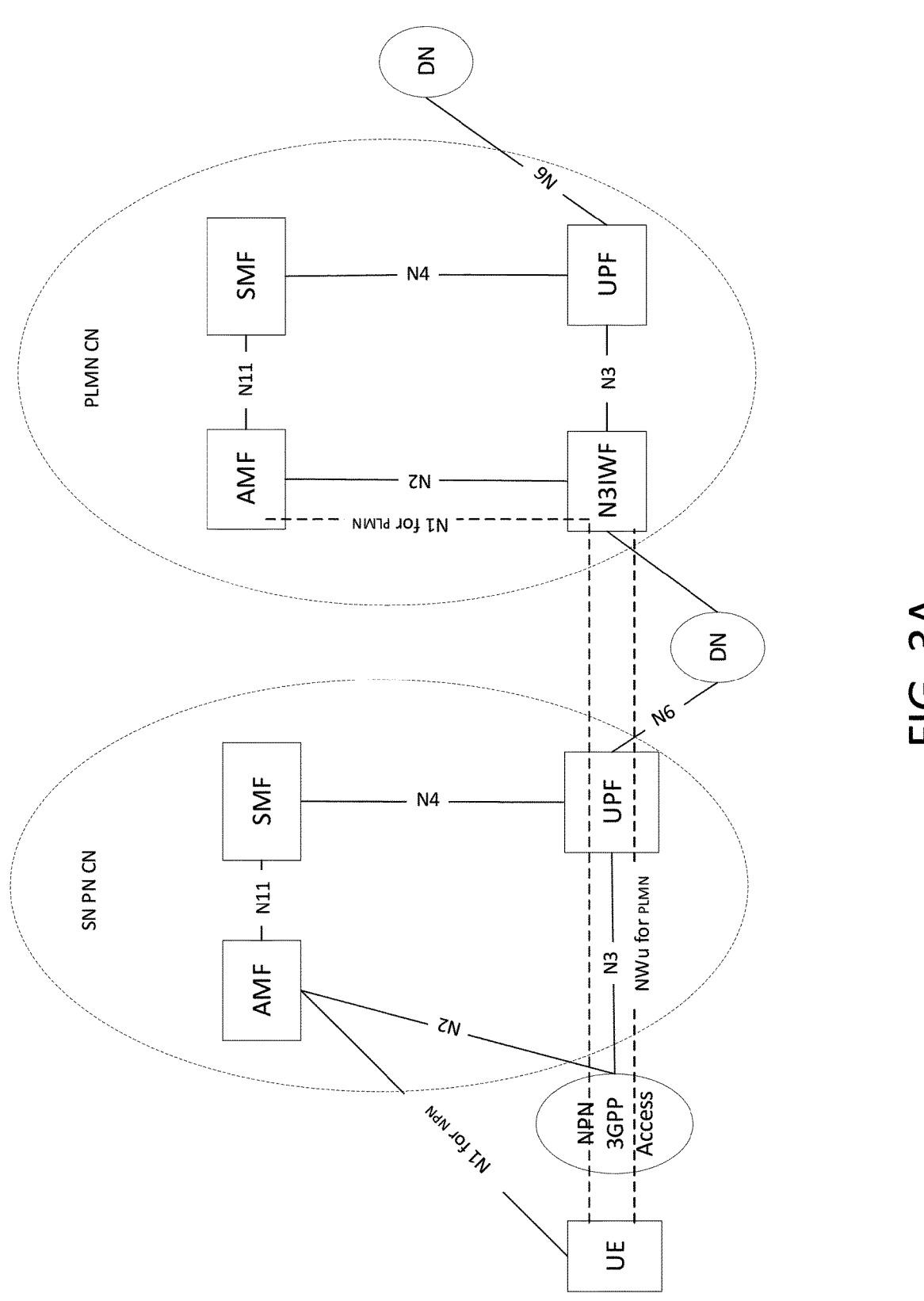
Figure 3B:
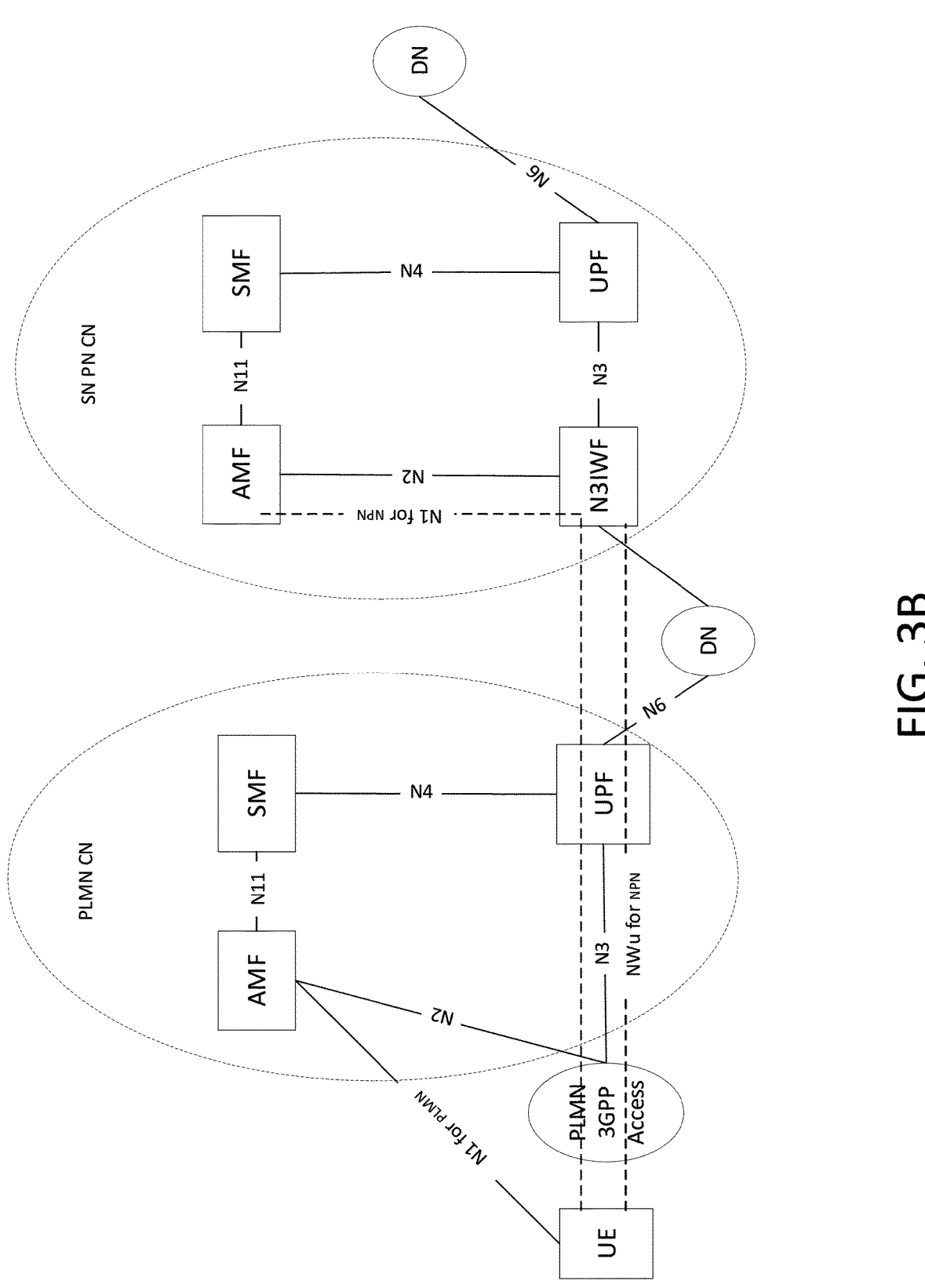
Figure 4:
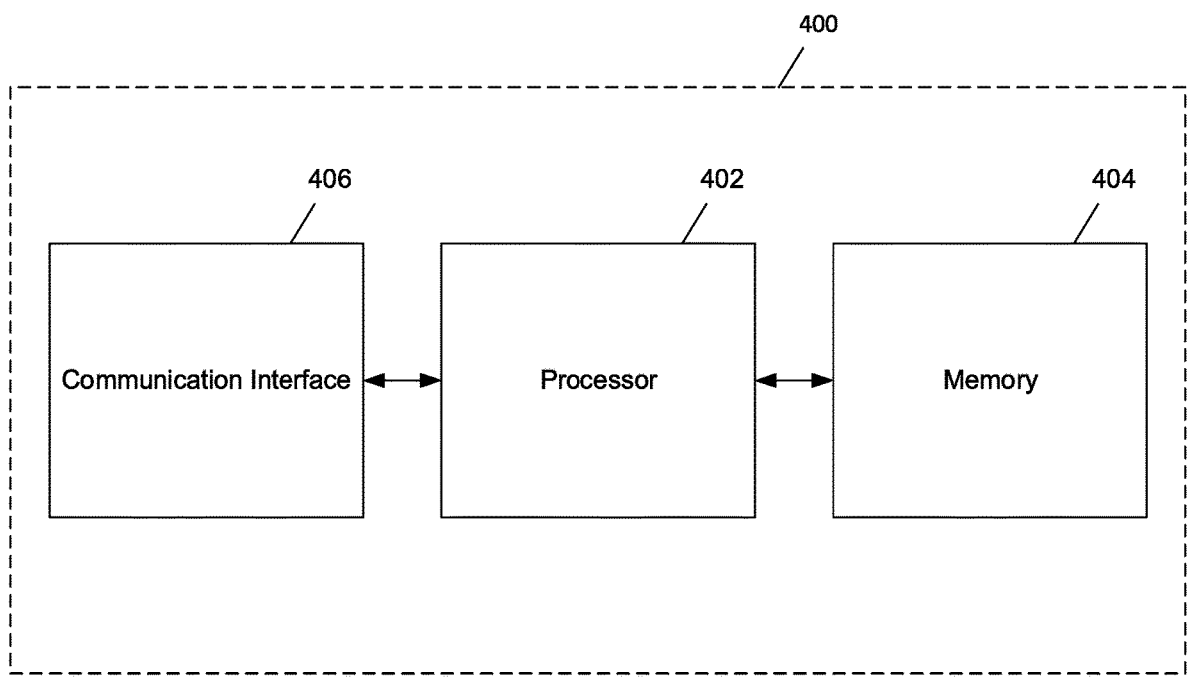
Figure 5:
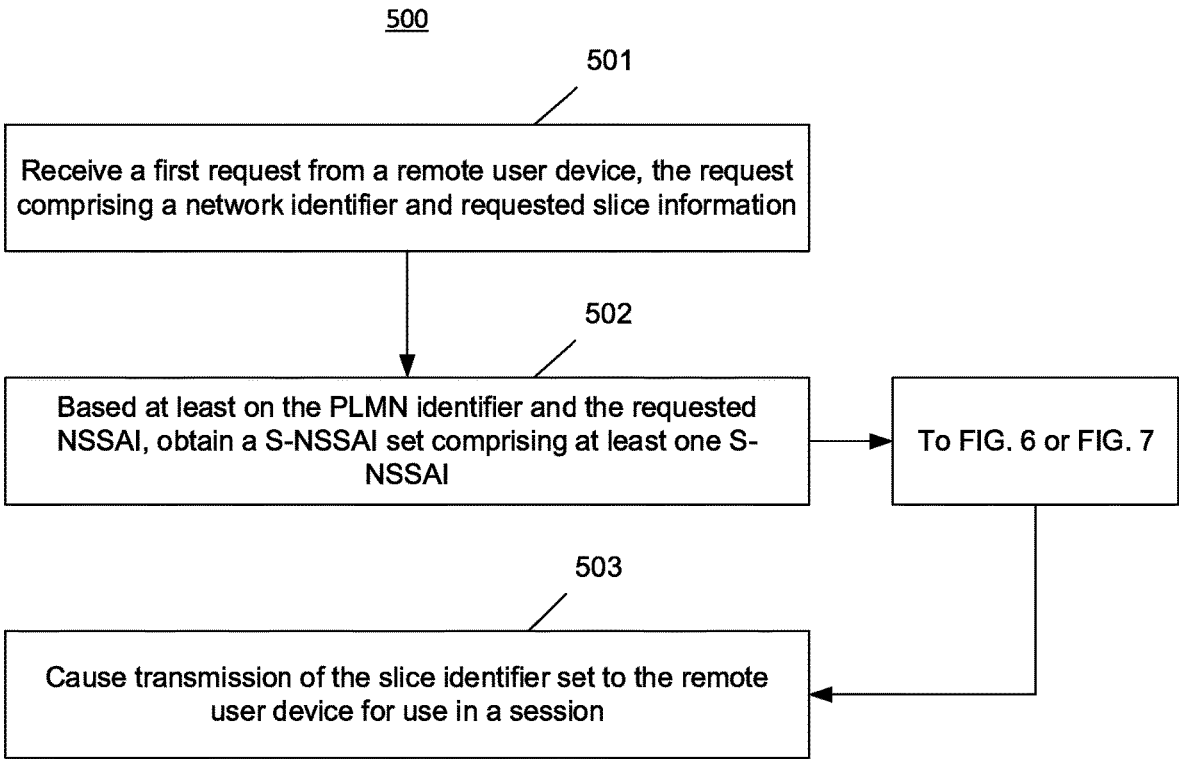
Figure 6A:
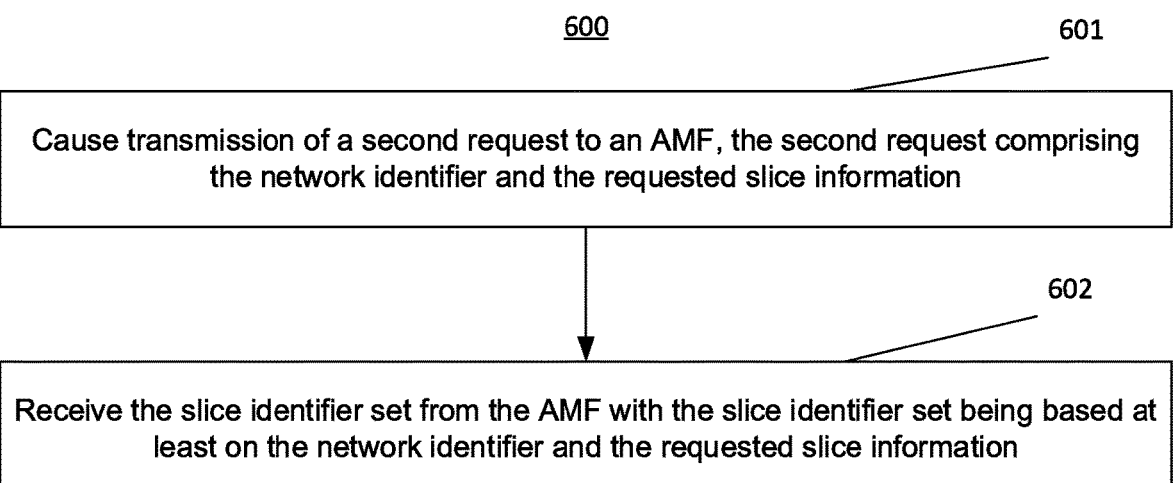
Figure 6B:
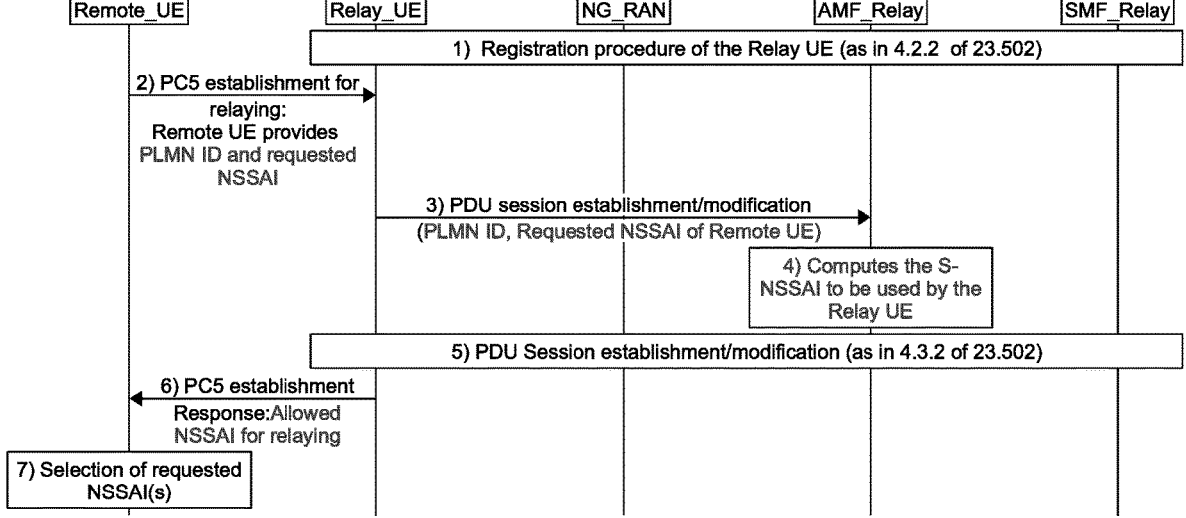
Figure 7A:
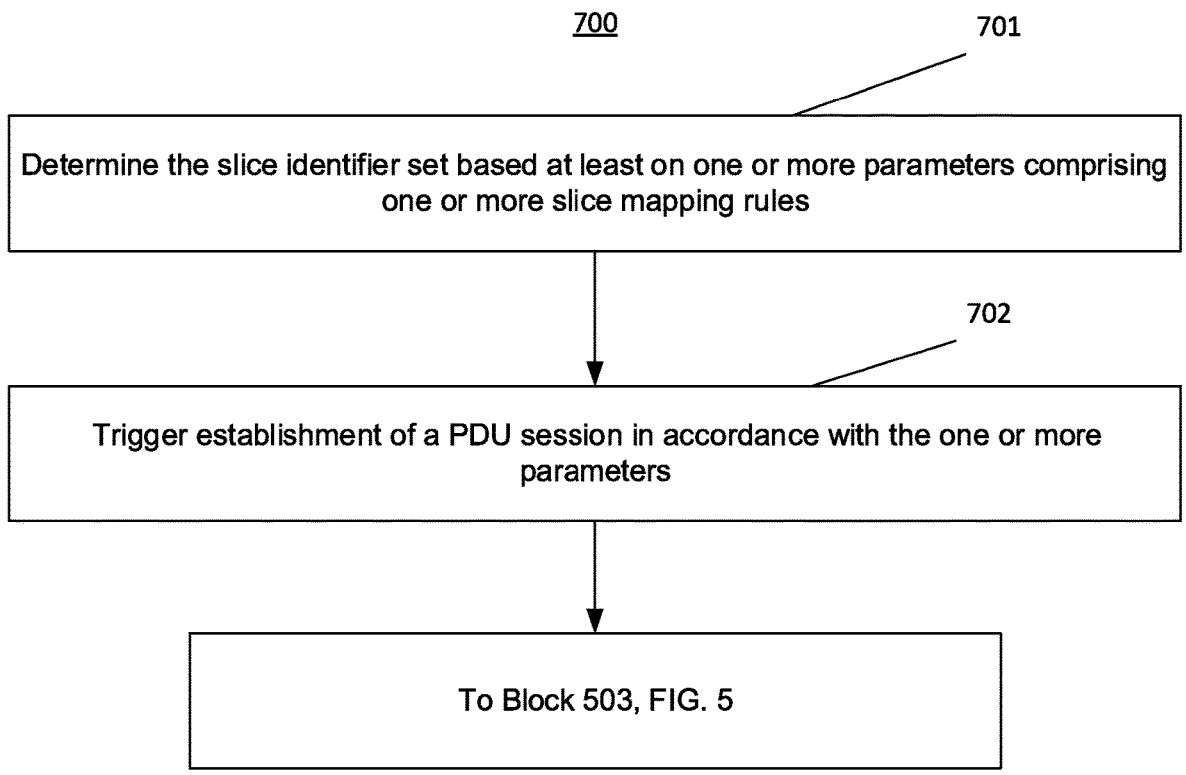
Figure 7B:
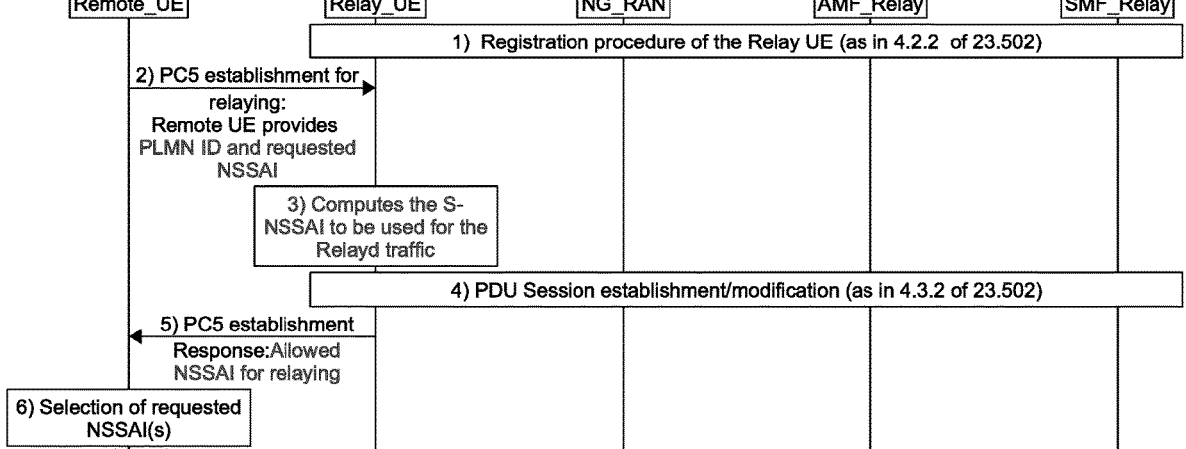

Having thus described embodiments of the disclosure in general terms, reference will now be made to the accompanying drawings, which are not necessarily drawn to scale, and wherein:

FIG. 1 illustrates an example architecture for a communications network, in accordance with an example embodiment of the present disclosure;

FIG. 2 illustrates example protocol stacks, in accordance with an example embodiment of the present disclosure;

FIG. 3A illustrates example access to Public Land Mobile Network (PLMN) services via a stand-alone Non-Public Network (SNPN), in accordance with an example embodiment of the present disclosure;

FIG. 3B illustrates example access to SNPN services via a PLMN, in accordance with an example embodiment of the present disclosure;

FIG. 4 illustrates a block diagram of an apparatus that may be specifically configured in accordance with an example embodiment of the present disclosure;

FIG. 5 is a flow diagram illustrating operations performed in accordance with an example embodiment;

FIG. 6A is a flow diagram illustrating operations performed in accordance with an example embodiment;

FIG. 6B is a signal diagram further illustrating operations performed in FIG. 6A in accordance with an example embodiment;

FIG. 7A is a flow diagram illustrating operations performed in accordance with an example embodiment; and FIG. 7B is a signal diagram further illustrating operations performed in FIG. 7A in accordance with an example embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention can be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms can be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Additionally, as used herein, the terms "node," "entity," "intermediary," "intermediate entity," "go-between," and similar terms can be used interchangeably to refer to computers connected via, or programs running on, a network or plurality of networks capable of data creation, modification, deletion, transmission, receipt, and/or storage in accordance with embodiments of the present invention. Thus, use of any such terms should not be taken to limit the spirit and scope of embodiments of the present invention.

Additionally, as used herein, the terms "user equipment," "user device," "device," "apparatus," "mobile device," "personal computer," "laptop computer," "laptop," "desktop computer," "desktop," "mobile phone," "tablet," "smartphone," "smart device," "cellphone," "computing device," "communication device," "user communication device," "terminal," and similar terms can be used interchangeably to refer to an apparatus, such as may be embodied by a computing device, configured to access a network or plurality of networks for at least the purpose of wired and/or wireless transmission of communication signals in accordance with certain embodiments of the present disclosure. Thus, use of any such terms should not be taken to limit the spirit and scope of embodiments of the present disclosure.

Additionally, as used herein, the terms "network slice," "specific slice," "slice," "network portion," "disjoint slice," "isolated slice," and similar terms can be used interchangeably to refer to an end to end logical communication network, or portion thereof, within a Public Land Mobile Network (PLMN), Stand-Alone Non-Public Network (SNPN), a Public Network Integrated NPN (PNI-NPN), and/or the like.

As used herein, a "computer-readable storage medium," which refers to a non-transitory physical storage medium (e.g., volatile or non-volatile memory device), can be differentiated from a "computer-readable transmission medium," which refers to an electromagnetic signal. Such a medium can take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media.

Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc (BD), the like, or combinations thereof), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums can be substituted for or used in addition to the computer-readable storage medium in alternative embodiments.

In the following, certain embodiments are explained with reference to communication devices capable of communication via a wired and/or wireless network and communication systems serving such communication devices. Before explaining in detail these example embodiments, certain general principles of a wired and/or wireless communication system, access systems thereof, and communication devices are briefly explained with reference to FIGS. 1-4 to assist in understanding the technology underlying the described examples.

According to some embodiments, a communication device or terminal can be provided for wireless access via cells, base stations, access points, the like (e.g., wireless transmitter and/or receiver nodes providing access points for a radio access communication system and/or other forms of wired and/or wireless networks), or combinations thereof. Such wired and/or wireless networks include, but are not limited to, networks configured to conform to 2G, 3G, 4G, LTE, 5G, and/or any other similar or yet to be developed future communication network standards. The present disclosure contemplates that any methods, apparatuses, computer program codes, and any portions or combination thereof can also be implemented with yet undeveloped communication networks and associated standards as would be developed in the future and understood by one skilled in the art in light of the present disclosure.

Access points and hence communications there through are typically controlled by at least one appropriate control apparatus so as to enable operation thereof and management of mobile communication devices in communication therewith. In some embodiments, a control apparatus for a node can be integrated with, coupled to, and/or otherwise provided for controlling the access points. In some embodiments, the control apparatus can be arranged to allow communications between a user equipment and a core network or a network entity of the core network. For this purpose, the control apparatus can comprise at least one memory, at least one data processing unit such as a processor or the like, and an input/output interface (e.g., global positioning system receiver/transmitter, keyboard, mouse, touchpad, display, universal serial bus (USB), Bluetooth, ethernet, wired/wireless connections, the like, or combinations thereof).

Moreover, via the interface, the control apparatus can be coupled to relevant other components of the access point. The control apparatus can be configured to execute an appropriate software code to provide the control functions. It shall be appreciated that similar components can be provided in a control apparatus provided elsewhere in the network system, for example in a core network entity. The control apparatus can be interconnected with other control entities. The control apparatus and functions can be distributed between several control units. In some embodiments, each base station can comprise a control apparatus. In alternative embodiments, two or more base stations can share a control apparatus.

Access points and associated controllers can communicate with each other via a fixed line connection and/or via a radio interface. The logical connection between the base station nodes can be provided for example by an XN interface, an N2 interface, a similar interface, or combinations thereof. This interface can be used for example for coordination of operation of the stations and performing reselection or handover operations. The logical communication connection between the initial communication node and the final communication node of the network can comprise a plurality of intermediary nodes. Additionally, any of the nodes can be added to and removed from the logical communication connection as required to establish and maintain a network function communication.

The communication device or user equipment can comprise any suitable device capable of at least receiving a communication signal comprising data. The communication signal can be transmitted via a wired connection, a wireless connection, or combinations thereof. For example, the device can be a handheld data processing device equipped with radio receiver, data processing and user interface apparatus. Non-limiting examples include a mobile station (MS) such as a mobile phone or what is known as a 'smart phone,' a portable computer such as a laptop or a tablet computer provided with a wireless interface card or other wireless interface facility, personal data assistant (PDA) provided with wireless communication capabilities, or any combinations of these or the like. Further examples include wearable wireless devices such as those integrated with watches or smart watches, eyewear, helmets, hats, clothing, earpieces with wireless connectivity, jewelry and so on, Universal Serial Bus (USB) sticks with wireless capabilities, modem data cards, machine type devices or any combinations of these or the like.

In some embodiments, a communication device, e.g., configured for communication with the wireless network or a core network entity, can be exemplified by a handheld or otherwise mobile communication device or user equipment. A mobile communication device can be provided with wireless communication capabilities and appropriate electronic control apparatus for enabling operation thereof. Thus, the communication device can be provided with at least one data processing entity, for example a central processing unit and/or a core processor, at least one memory and other possible components such as additional processors and memories for use in software and hardware aided execution of tasks it is designed to perform. The data processing, storage, and other relevant control apparatus can be provided on an appropriate circuit board and/or in chipsets.

Data processing and memory functions provided by the control apparatus of the communication device are configured to cause control and signaling operations in accordance with certain embodiments as described later in this description. A user can control the operation of the communication device by means of a suitable user interface such as touch sensitive display screen or pad and/or a keypad, one of more actuator buttons, voice commands, combinations of these, or the like. A speaker and a microphone are also typically provided. Furthermore, a mobile communication device can comprise appropriate connectors (either wired or wireless) to other devices and/or for connecting external accessories, for example hands-free equipment, thereto.

In some embodiments, a communication device can communicate wirelessly via one or more appropriate apparatuses for receiving and transmitting signals (e.g., global positioning system receiver/transmitter, remote touchpad interface with remote display, Wi-Fi interface, etc.). In some embodiments, a radio unit can be connected to the control apparatus of the device. The radio unit can comprise a radio part and associated antenna arrangement. The antenna arrangement can be arranged internally or externally to the communication device.

Embodiments described herein may relate to several types of deployments. One type of deployment may be a Device to Device (D2D) deployment, which may use Layer 3 user equipment (UE)-to-network relay (relay UE), allowing a remote user device (or UE) to access its serving network (referred to as an "overlay network" herein) over a relay UE and the serving network of the relay UE (referred to as an "underlay network" herein).

Another example of a type of deployment may be a Standalone Non Public Network (SNPN) deployment that allows a UE to reach its PLMN (an overlay network in this example) over an SNPN (an underlay network in this example). Though these deployments have different usecases, embodiments described herein with respect to slice selection may be similar in both types of deployments.

FIG. 1 illustrates an example Layer 3 UE-to-network relay architecture as described above. In some embodiments, the 5G Core Network (5GC) serving the relay UE and the 5GC serving the remote UE may correspond to the same 5GC network. In some embodiments, the 5GC serving the relay UE and the 5Gc serving the remote UE may correspond to different networks. For example, in FIG. 1, the 5GC (serving and Home) of the remote UE may be a network different than the 5GC (serving and Home) of the relay UE. Additionally in FIG. 1, the User Plane Function (UPF) (relay UE) may represent the Packet Data Unit (PDU) Session Anchor (PSA) of the relay UE, and the UPF (remote UE) may represent the Packet Data Unit (PDU) Session Anchor (PSA) of the remote UE.

FIG. 2 illustrates an example protocol stack corresponding to the architecture model of FIG. 1. In this regard, FIG. 2 shows example protocol stacks with a 5G UE-to Network L3 Relay solution, with usage of a Non-3GPP Interworking Function (N3IWF).

FIGS. 3A and 3B illustrate several example deployments using SNPN. FIG. 3A shows example access to PLMN services via an SNPN, while FIG. 3B shows example access to SNPN services via a PLMN.

In some examples, a remote UE (in both cases of D2D and SNPN deployments) may desire to access two slices (e.g., slice "A" and slice "B") at the overlay network (e.g., the network that provides actual service to the remote UE), however, the remote UE may require the connectivity of an underlay network in order to reach a N3IWF providing access to its overlay network.

In order to reach the N3IWF over the underlay network, a PDU session needs to be established at the underlay network, and this PDU session is to be both unique regardless of the number of slices or PDU sessions being used and associated with a slice from the underlay network that best meets the requirements of the slices the remote UE desires to access (e.g., slice "A" and "B").

In this regard, embodiments herein describe solutions to the question of which slice to request from the relay UE (intermediate network in the case of SNPN deployment) to set up the PDU session to reach the N3IWF. Said differently, if a remote UE desires to register onto the overlay network with a requested NSSAI ("A" and "B") embodiments herein may determine which slice should be requested from the underlay network.

For example, a remote UE cannot determine whether needed NSSAI(s) would be supported in the relay network in a D2D case and/or underlay network in a Non-Public Network (NPN) case. In this regard, embodiments herein introduce a signaling mechanism by which the remote UE may prune its NSSAIs to use in its registration towards the overlay network (remote network in a D2D case) to a subset of NSSAIs that are acceptable also for the relay network in a D2D case and/or underlay network in a NPN case.

It will be appreciated that certain example embodiments described herein arise in the context of a telecommunications network, including but not limited to a telecommunications network that conforms to and/or otherwise incorporates aspects of a fifth-generation (5G) architecture. While FIGS. 1-3 illustrate various configurations and/or components of example architectures of a communications network, many other systems, system configurations, networks, network entities, and pathways/protocols for communication therein are contemplated and considered within the scope of this present disclosure.

While the methods, devices/apparatuses, and computer program products/code described herein are described within the context of a fifth-generation core network (5GC) and system, such as illustrated in FIGS. 1-3B and described hereinabove, the described methods, devices, and computer program products can nevertheless be applied in a broader context within any suitable telecommunications system, network, standard, and/or protocol. It will be appreciated that the described methods, devices, and computer program products can further be applied to yet undeveloped future networks and systems as would be apparent to one skilled in the art in light of the present disclosure.

Turning now to FIG. 4, examples of an apparatus that may be embodied by the user equipment or by a network entity, such as server or other computing device are depicted in accordance with an example embodiment of the present disclosure. As described below in conjunction with the flowcharts and block diagrams presented herein, the apparatus 400 of an example embodiment can be configured to perform the functions described herein. In any instance, the apparatus 400 can more generally be embodied by a computing device, such as a server, a personal computer, a computer workstation or other type of computing device including those functioning as a user equipment and/or a component of a wireless network or a wireless local area network. Regardless of the manner in which the apparatus 400 is embodied, the apparatus of an example embodiment can be configured as shown in FIG. 4 so as to include, be associated with or otherwise be in communication with a processor 402 and a memory device 404 and, in some embodiments, and/or a communication interface 406.

Although not illustrated, the apparatus of an example embodiment may also optionally include a user interface, such as a touch screen, a display, a keypad, the like, or combinations thereof. Moreover, the apparatus according to example embodiments can be configured with a global positioning circuit that comprises a global positioning receiver and/or global positioning transmitter configured for communication with one or more global navigation satellite systems (e.g., GPS, GLONASS, Galileo, the like, or combinations thereof). The global positioning circuit may be configured for the transmission and/or receipt of direct/indirect satellite and/or cell signals in order to determine geolocation data (e.g., latitude, longitude, elevation, altitude, geographic coordinates, the like, or combinations thereof) for the apparatus and/or another communication device associated with the apparatus or the one or more global navigation satellite systems. In some embodiments, geolocation data may comprise a time dimension, such as a time stamp that associates the geolocation data with a respective time (e.g., 01:00 AM EST, etc.), a respective date (e.g., Sep. 26, 4020, etc.), and/or the like. The time dimension may be configured based on one or more of a time of receipt, generation, transmission, and/or the like (e.g., by the apparatus). In some embodiments, geolocation data may be associated with one or more time dimensions.

The processor 402 (and/or co-processors or any other circuitry assisting or otherwise associated with the processor) can be in communication with the memory device 404 via a bus for passing information among components of the apparatus 400. The memory device can include, for example, one or more volatile and/or non-volatile memories, such as a non-transitory memory device. In other words, for example, the memory device can be an electronic storage device (e.g., a computer readable storage medium) comprising gates configured to store data (e.g., bits) that can be retrievable by a machine (e.g., a computing device like the processor). The memory device can be configured to store information, data, content, applications, instructions, the like, or combinations thereof for enabling the apparatus to carry out various functions in accordance with an example embodiment. For example, the memory device could be configured to buffer input data for processing by the processor. Additionally or alternatively, the memory device could be configured to store instructions for execution by the processor.

The apparatus 400 can, in some embodiments, be embodied in various computing devices as described above. However, in some embodiments, the apparatus can be embodied as a chip or chip set. In other words, the apparatus can comprise one or more physical packages (e.g., chips) including materials, components and/or wires on a structural assembly (e.g., a baseboard). The structural assembly can provide physical strength, conservation of size, and/or limitation of electrical interaction for component circuitry included thereon. The apparatus can therefore, in some cases, be configured to implement an embodiment of the present invention on a single chip or as a single "system on a chip." As such, in some cases, a chip or chipset can constitute means for performing one or more operations for providing the functionalities described herein.

The processor 402 can be embodied in a number of different ways. For example, the processor can be embodied as one or more of various hardware processing means such as a coprocessor, a microprocessor, a controller, a Digital Signal Processor (DSP), a processing element with or without an accompanying DSP, or various other circuitry including integrated circuits such as, for example, an Application Specific Integrated Circuit (ASIC), a Field Programmable Gate Array (FPGA), a Micro-Controller Unit (MCU), a hardware accelerator, a special-purpose computer chip, or the like. As such, in some embodiments, the processor can include one or more processing cores configured to perform independently. A multi-core processor can enable multiprocessing within a single physical package. Additionally or alternatively, the processor can include one or more processors configured in tandem via the bus to enable independent execution of instructions, pipelining and/or multithreading.

In an example embodiment, the processor 402 can be configured to execute instructions stored in the memory device 404 or otherwise accessible to the processor. Alternatively or additionally, the processor can be configured to execute hard coded functionality. As such, whether configured by hardware or software methods, or by a combination thereof, the processor can represent an entity (e.g., physically embodied in circuitry) capable of performing operations according to an embodiment of the present disclosure while configured accordingly. Thus, for example, when the processor is embodied as an ASIC, FPGA, the like, or combinations thereof the processor can be specifically configured hardware for conducting the operations described herein. Alternatively, as another example, when the processor is embodied as an executor of instructions, the instructions can specifically configure the processor to perform the algorithms and/or operations described herein when the instructions are executed. However, in some cases, the processor can be a processor of a specific device (e.g., an encoder and/or a decoder) configured to employ an embodiment of the present invention by further configuration of the processor by instructions for performing the algorithms and/or operations described herein. The processor can include, among other things, a clock, an Arithmetic Logic Unit (ALU) and logic gates configured to support operation of the processor.

In embodiments that include a communication interface 406, the communication interface can be any means such as a device or circuitry embodied in either hardware or a combination of hardware and software that is configured to receive and/or transmit data from/to a network and/or any other device or module in communication with the apparatus 400, such as network functions, network repository functions, a base station, an access point, service communication proxies, UE, Radio Access Network (RAN), core network services, AS/AF, a database or other storage device, the like, or combinations thereof. In this regard, the communication interface can include, for example, one or more antennas and supporting hardware and/or software for enabling communications with a wireless communication network. Additionally or alternatively, the communication interface can include the circuitry for interacting with the one or more antennas to cause transmission of signals via the one or more antennas or to handle receipt of signals received via the one or more antennas.

In some embodiments, the one or more antennas may comprise one or more of a dipole antenna, monopole antenna, helix antenna, loop antenna, waveguide, horn antenna, parabolic reflectors, corner reflectors, dishes, micro strip patch array, convex-plane, concave-plane, convex-convex, concave-concave lenses, the like or combinations thereof. In some environments, the communication interface can alternatively or also support wired communication. As such, for example, the communication interface can include a communication modem and/or other hardware/software for supporting communication via cable, Digital Subscriber Line (DSL), USB, the like or combinations thereof.

As illustrated, the apparatus 400 can include a processor 402 in communication with a memory 404 and configured to provide signals to and receive signals from a communication interface 406. In some embodiments, the communication interface 406 can include a transmitter and a receiver. In some embodiments, the processor 402 can be configured to control the functioning of the apparatus 400, at least in part. In some embodiments, the processor 402 can be configured to control the functioning of the transmitter and receiver by effecting control signaling via electrical leads to the transmitter and receiver. Likewise, the processor 402 can be configured to control other elements of apparatus 400 by effecting control signaling via electrical leads connecting the processor 402 to the other elements, such as a display or the memory 404.

The apparatus 400 can be capable of operating with one or more air interface standards, communication protocols, modulation types, access types, and/or the like. Signals sent and received by the processor 402 can include signaling information in accordance with an air interface standard of an applicable cellular system, and/or any number of different wireline or wireless networking techniques, comprising but not limited to Wi-Fi, Wireless Local Access Network (WLAN) techniques, such as Institute of Electrical and Electronics Engineers (IEEE) 802.11, 802.16, 802.3, Asymmetric Digital Subscriber Line (ADSL), Data Over Cable Service Interface Specification (DOCSIS), the like, or combinations thereof. In addition, these signals can include speech data, user generated data, user requested data, the like, or combinations thereof.

For example, the apparatus 400 and/or a cellular modem therein can be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, Session Initiation Protocol (SIP)), the like, or combinations thereof. For example, the apparatus 400 can be capable of operating in accordance with 2G wireless communication protocols Interim Standard (IS) 136 (IS-136), Time Division Multiple Access (TDMA), GSM, IS-95, Code Division Multiple Access, Code Division Multiple Access (CDMA), the like, or combinations thereof. In addition, for example, the apparatus 400 can be capable of operating in accordance with 2.5G wireless communication protocols GPRS, Enhanced Data GSM Environment (EDGE), the like, or combinations thereof.

Further, for example, the apparatus 400 can be capable of operating in accordance with 3G wireless communication protocols, such as UNITS, Code Division Multiple Access 4000 (CDMA4000), Wideband Code Division Multiple Access (WCDMA), Time Division-Synchronous Code Division Multiple Access (TD-SCDMA), the like, or combinations thereof. The NA 400 can be additionally capable of operating in accordance with 3.9G wireless communication protocols, such as Long Term Evolution (LTE), Evolved Universal Terrestrial Radio Access Network (E-UTRAN), the like, or combinations thereof.

Additionally, for example, the apparatus 400 can be capable of operating in accordance with 4G wireless communication protocols, such as LTE Advanced, 5G, and/or the like as well as similar wireless communication protocols that can be subsequently developed. In some embodiments, the apparatus 400 can be capable of operating according to or within the framework of any suitable CUPS architecture, such as for the gateway GGSN-C, TWAG-C, Broadband Network Gateways (BNGs), N4 interface, Sxa interface, Sxb interface, Sxc interface, EPC SGW-C, EPC PGW-C, EPC TDF-C, the like, or combinations thereof. Indeed, although described herein in conjunction with operation with a 5G system, the apparatus and method may be configured to operate in conjunction with a number of other types of systems including systems hereinafter developed and implemented.

Some of the embodiments disclosed herein can be implemented in software, hardware, application logic, or a combination of software, hardware, and application logic. The software, application logic, and/or hardware can reside on memory 404, the processor 402, or electronic components, for example. In some example embodiments, the application logic, software or an instruction set is maintained on any one of various conventional computer-readable media. In the context of this document, a "computer-readable medium" can be any non-transitory media that can contain, store, communicate, propagate or transport the instructions for use by or in connection with an instruction execution system, apparatus, or device, such as a computer or data processor circuitry, with examples depicted at FIG. 4. The computer-readable medium can comprise a non-transitory computer-readable storage medium that can be any media that can contain or store the instructions for use by or in connection with an instruction execution system, apparatus, or device, such as a computer.

In some embodiments, such as embodiments having a Layer 3 UE-to-network relay deployment, a remote UE may transmit a request to a relay UE over PC5 to obtain connectivity. PC5 refers to a reference point where UE directly communicates with another UE over a direct channel. In this case, communication with a base station may not be required.

In some embodiments, the request sent by the remote UE may comprise a PLMN identifier (ID) indicating a particular PLMN, such as the Home PLMN identifier of the remote UE. The request may also comprise an intended requested NSSAI. The intended requested NSSAI may comprise a listing of all S-NSSAIs which the remote UE intends to be presented as requested NSSAI within a NAS registration request message that will be sent to the overlay network (e.g., 5GC, Access and Mobility Management Function (AMF)) by the remote UE.

In an embodiment, one or more slice mapping rules configured at the relay UE may be used to translate the intended requested NSSAI received over PC5 from the remote UE together with the Home PLMN identifier of the remote UE into a unique S-NSSAI (Data Network Name (DNN), S-NSSAI) for a PDU session used by the relay UE towards relay 5GC for the relayed traffic of the remote UE. This may require the relay UE to establish a new PDU session or to modify an existing PDU session.

In an embodiment, the relay UE may have received these slice mapping rules from a Policy Control Function (PCF) of the network serving the relay UE.

In another embodiment, the relay UE may send a request (e.g., via NAS) to its associated AMF to translate the intended requested NSSAI and the Home PLMN identifier of the remote UE into a unique S-NSSAI. This unique S-NSSAI may be used by the PDU session that is to be used by the relay UE for the relayed traffic of the remote UE. This may require the relay UE to establish a new PDU session or modify an existing PDU session.

In either embodiment described above, subscription of the relay UE and/or the capabilities of the access where it is accessing to the overlay network may not allow support to all slices within the intended requested NSSAI received from the remote UE. The relay UE may answer back to the remote UE with the remote UE slices (e.g., NSSAI allowed for relaying) that can be supported by the relay UE and its serving network. Based on this, the remote UE may prune out slices from its list of intended requested NSSAI when issuing a registration request to the overlay network. In other words, the remote UE need not include S-NSSAI in the registration request sent to the overlay network for a slice that is not supported by the underlay network).

In some embodiments, the requesting (e.g., via NAS) by the relay UE to its AMF to translate the intended requested NSSAI received from the remote UE into the unique S-NS-SAI of the PDU session may comprise a NAS PDU session establishment (or modification) wherein the relay UE provides the (home) PLMN ID and the intended requested NSSAI received from the remote UE instead of a S-NSSAI. The AMF may take the Home PLMN ID and the intended requested NSSAI received from the relay UE into account and select the appropriate S-NSSAI for the PDU session, and the selected S-NSSAI will be provided to a Session Management Function (SMF) and be included as part of the PDU session accept message sent to the relay UE. The PDU session accept message may also comprise the NSSAI allowed for relaying that is propagated by the relay UE in a PC5 response to the remote UE.

In some embodiments, the requesting (e.g., via NAS) by the relay UE to its AMF to translate the requested NSSAI received from the remote UE into the unique S-NSSAI of the PDU session may comprise a dedicated NAS message requesting authorization for relaying the remote UE with the requested NSSAI received over PC5 from the remote UE.

In some embodiments, such as embodiments having deployments such as SNPN access via PLMN and PLMN access via SNPN as shown in FIGS. 3A and 3B, the UE may need to have a PDU session over the underlay network in order to reach a requested NSSAI of the overlay network. In one such embodiment, slice mapping rules configured in the UE may translate the requested NSSAI of the overlay network into the unique S-NSSAI of the PDU session the UE is to use over the underlay network.

In an embodiment, the UE may have received these slice mapping rules from a PCF of the underlay network.

In another embodiment, the UE may request (e.g., via NAS) its AMF in the underlay network to translate the intended requested NSSAI into the unique S-NSSAI of the PDU session the UE is to use over the underlay network. In either case, the subscription of the relay UE and/or the capabilities of the access where it is accessing to the overlay network may not allow support of all slices within the intended requested NSSAI. Based on either slice mapping rules or the AMF answer, the UE may need to prune out slices from its list of intended requested S-NSSAIs when issuing a registration request to the overlay network. The slice mapping rules may need to take the HPLMN of the UE into account in order to translate slices of the overlay network.

Further, in embodiments described above, rules may be used to emphasize support for a most demanding slice of the intended requested NSSAI sent by the remote UE or that the UE, in the SNPN case, desires to access over its overlay network. For example, one such rule may be that if the (remote) UE requests an eMBB slice and a URLLC slice, the PDU session of the relay UE (or the underlay network) to be used for the related traffic of the (remote) UE must correspond to the URLLC slice. As another example rule, if the remote UE requests an eMBB slice and a Cellular Internet of Things (CIoT) slice, the PDU session of the relay UE (or on the underlay network) to be used for the relayed traffic of the remote UE must correspond to the CIoT slice.

In some embodiments, if a rule indicates that a relay slice R1 (S-NSSAI) can be used for Slice X1 and Slice X2 of the HPLMN of the remote UE and the relay UE has a subscription for Relay Slice R1, then the relay UE may provide access to Slice X1, and X2 for remote UEs of that HPLMN. In some embodiments, such slice mapping rules may be configured by the Policy Control Function (PCF) of the relay UE and run in the relay UE. In other embodiments, such rules may correspond to local AMF policies.

Turning to FIG. 5, at operation 501, the apparatus 400 includes means, such as the processor 402, communication interface 406, and/or the like, configured to receive a first request from a remote user device, the request comprising a network identifier and requested slice information. For example, the network identifier may be PLMN identifier (PLMN ID). The requested slice information may comprise requested NSSAI. In this regard, the apparatus 400 may be embodied by a relay UE. As described above, the requested NSSAI may comprise a listing of all S-NSSAIs that will be presented as requested NSSAIs within a NAS registration request message that the remote UE plans to send to the overlay network (5GC/AMF of the remote UE).

In some embodiments, it may be assumed that the relay UE has registered for itself. The relay UE may have also acquired service (PDU sessions) for itself. In this regard, the relay UE registration may allow the UE to access slices (S-NSSAI) eligible to support traffic of remote UE(s).

Likewise, in deployments involving SNPN, it may be assumed that the UE has registered for itself on the underlay network. The UE may have also acquired service (PDU sessions) from the underlay network. The UE registration to the underlay network may allow the UE to access slices (S-NSSAI) eligible to support traffic towards the overlay network.

In some embodiments, the first request may be a request comprising an attempt to establish a PC5 connection to the relay UE. In this regard, during the PC5 establishment, the remote UE may provide its PLMN ID and its intended requested NSSAI. It should be appreciated that the remote UE may discover the relay UE in any sort of manner. Likewise, in deployments involving SNPN, the first request may correspond to an internal detection within the UE that the UE needs services from the overlay network together with the intended requested NSSAI associated with these services.

At operation 502, the apparatus 400 includes means, such as the processor 402, communication interface 406, memory 404, and/or the like, configured to, based at least on the network identifier and the requested slice information, obtain a slice identifier set (e.g., NSSAI) comprising at least one slice identifier (e.g., S-NSSAI). For example, the apparatus 300 may obtain a first slice identifier (S-NSSAI) for a PDU session and a slice identifier set (NSSAI) allowed for relaying.

As described above, obtaining the slice identifier set (and the S-NSSAI of the PDU session) may be achieved in multiple ways, such as by either of the methods shown in FIGS. 6A and 7A.

Turning briefly to method 600 of FIG. 6A, at operation 601, the apparatus 400 includes means, such as the processor 402, communication interface 406, and/or the like, configured to cause transmission of a second request to an AMF, the second request comprising the network identifier and the intended requested slice information. In this regard, the relay UE may contact its AMF and send a second request providing the PLMN ID and the intended requested NSSAI provided by the remote UE. In some embodiments, the second request may comprise a PDU session establishment or modification. Such a request may also comprise a request for an authorization for relaying the remote UE, with parameters including the PLMN ID and the intended requested NSSAI. Likewise, in deployments involving SNPN, the UE may contact its AMF (of the underlay network) and send a second request providing the PLMN ID and the intended requested NSSAI. In some embodiments, the second request may comprise a PDU session establishment or modification.

In embodiments described herein, NAS may only be exchanged between the relay UE and its serving network. In this regard, a remote UE may only exchange NAS with its serving network once the method of FIG. 5 has been carried out.

Once the AMF receives the second request, and based at least on local configuration and on the relay UE subscription, the AMF may determine the S-NSSAI to be used by the relay UE to carry traffic of the remote UE within the underlay network and the corresponding NSSAI of the overlay network allowed for relaying to be provided back to the remote UE. The AMF may then proceed with establishment (or modification) of a PDU session with the selected S-NSSAI. Likewise, for SNPN deployments, once the AMF of the underlay network receives the second request, and based at least on local configuration and on the UE subscription (for the underlay network), the AMF may determine the S-NSSAI to be used by the UE to carry traffic to the overlay network within the underlay network and the corresponding NSSAI of the overlay network allowed for relaying to be provided back to the UE. The AMF may then proceed with establishment (or modification) of a PDU session within the underlay network with the selected S-NSSAI.

At operation 602, the apparatus 400 includes means, such as the processor 402, communication interface 406, and/or the like, configured to receive the slice identifier set from the AMF, the slice identifier set being based at least on the network identifier and the intended requested slice information.

In this regard, the AMF answers the request sent by the relay UE, providing information on the PDU session that was established (or modified) in the underlay network for the remote UE, along with S-NSSAI used for the PDU session established for relaying the traffic and the corresponding NSSAI of the overlay network allowed for relaying that is to be provided back to the remote UE. The process may then continue to operation 503 of FIG. 5, wherein the apparatus 400 includes means, such as the processor 402, communication interface 406, and/or the like, configured to cause transmission of the slice identifier set to the remote user device for use in a session (e.g., a PDU session). In this regard, the relay UE may provide NSSAI of the overlay network that are allowed for relaying. Likewise, for SNPN deployments, the AMF may answer the request sent by the UE, providing information on the PDU session that was established (or modified) in the underlay network for the UE, along with S-NSSAI used for the PDU session established for relaying the traffic and the corresponding NSSAI of the overlay network allowed for relaying. The process may then continue to operation 503 of FIG. 5, wherein the apparatus 400 includes means, such as the processor 402, communication interface 406, and/or the like, configured to cause transmission of the slice identifier set within the UE for use by the UE when accessing the overlay network The remote UE, in some embodiments, may then prune out slices from its originally requested slice information when (at a later time) issuing a registration request to the overlay network. After this pruning, registration and authentication towards the overlay network (remote network in the case of D2D) may take place as normal, however potentially with a reduced set of NSSAIs that have already been verified with the relay network (in the case of D2D) or underlay network (in the case of NPN). Likewise, for SNPN deployments, the UE, in some embodiments, may then prune out (e.g., remove) slices from its originally requested slice information when (at a later time) issuing a registration request to the overlay network. After this pruning, registration and authentication towards the overlay network may take place as normal, however potentially with a reduced set of NSSAIs that have already been verified with the underlay network.

FIG. 6B is a signal diagram of an example data flow represented by method 600. Method 600 is described as being performed using a relay UE in communication with a remote UE, AMF, and Session Management Function (SMF).

In another embodiment, obtaining the S-NSSAI set may be achieved by the methods 700 shown in FIG. 7A.

At operation 701, the apparatus 400 includes means, such as the processor 402, memory 404, and/or the like, configured to determine the slice identifier set based at least on one or more parameters comprising one or more slice mapping rules. In this regard, the relay UE may determine the S-NSSAI to be used for relayed traffic. For example, the relay UE may select the S-NSSAI and DNN for the PDU session to be used for relaying the traffic of the remote UE. In some embodiments, determining the slice identifier set may be based on local mapping rules (e.g., slice mapping rules) at the relay UE. Additionally, determining the slice identifier set may also take into account the intended requested slice information that was received from the remote UE, and/or capabilities of the access network the relay UE is connected to. Likewise, for SNPN deployments, the UE may determine the S-NSSAI to be used for traffic relayed over the underlay network. For example, the UE may select the S-NSSAI and DNN for the PDU session to be used for relaying the traffic over the underlay network. In some embodiments, determining the slice identifier may be based on local mapping rules (e.g., slice mapping rules) at the UE. Additionally, determining the slice identifier may also take into account the intended requested slice information that was intended to be used on the overlay network, and/or capabilities of the access network the UE is connected to. In both cases of a Relay UE and of a UE in SNPN deployments, the slice mapping rules may have been received from a policy control function.

At operation 702, the apparatus 400 includes means, such as the processor 402, memory 404, and/or the like, configured to trigger establishment (or modification) of a PDU session in accordance with the one or more parameters. In this regard, the relay UE (in a D2D case) or the UE (in an SNPN case) may trigger an establishment (or modification) of a PDU session using the S-NSSAI determined at step 701.

FIG. 7B is a signal diagram of an example data flow represented by method 700. Method 700 is described as being performed using a relay UE in communication with a remote UE, AMF, and Session Management Function (SMF).

As described above, similar methods (e.g., methods 500, 600, and 700) may apply to SNPN access over PLMN or PLMN access over SNPN (e.g., as shown in FIGS. 3A and 3B), with a unique UE taking the role of both the remote UE and relay UE and an internal interface within the unique UE replacing the PC5 interface of the example embodiments described above.

As described above, the referenced flowcharts of methods that can be carried out by an apparatus according to related computer program products comprising computer program code. It will be understood that each block of the flowcharts, and combinations of blocks in the flowcharts, can be implemented by various means, such as hardware, firmware, processor, circuitry, and/or other devices associated with execution of software including one or more computer program instructions. For example, one or more of the procedures described above can be embodied by computer program instructions. In this regard, the computer program instructions which embody the procedures described above can be stored by a memory device, e.g., 404, of an apparatus, e.g., 400, employing an embodiment of the present invention and executed by processor, e.g., 402, of the apparatus. As will be appreciated, any such computer program instructions can be loaded onto a computer or other programmable apparatus (e.g., hardware) to produce a machine, such that the resulting computer or other programmable apparatus implements the functions specified in the flowchart blocks.

These computer program instructions can also be stored in a computer-readable memory that can direct a computer or other programmable apparatus to function in a particular manner, such that the instructions stored in the computer-readable memory produce an article of manufacture, the execution of which implements the function specified in the flowchart blocks. The computer program instructions can also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above. In other embodiments, the computer program instructions, such as the computer-readable program code portions, need not be stored or otherwise embodied by a non-transitory computer-readable storage medium, but can, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations, methods, steps, processes, or the like, above can be modified or further amplified. Furthermore, in some embodiments, additional optional operations, methods, steps, processes, or the like, can be included. Modifications, additions, subtractions, inversions, correlations, proportional relationships, disproportional relationships, attenuation and/or amplifications to the operations above can be performed in any order and in any combination. It will also be appreciated that in instances where particular operations, methods, processes, or the like, required particular hardware such hardware may be considered as part of apparatus 400 for any such embodiment.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the appended claims. In this regard, for example, different combinations of elements and/or functions than those explicitly described above are also contemplated as can be set forth in some of the appended claims. Although specific terms are employed herein, they are used in a generic and descriptive sense only and not for purposes of limitation.

That which is claimed is:

1. A relay user equipment configured to be connected to an overlay network, the relay user equipment comprising: at least one processor; and at least one memory including computer program code, which, when executed by the at least one processor, causes the relay user equipment at least to:

receive a first request from a remote user device, the request comprising a Public Land Mobile Network (PLMN) identifier of a home PLMN of the remote user device and requested slice information comprising a listing of Single Network Slice Selection Assistance Informations (S-NSSAIs) which the remote user device intends to be presented as requested Network Slice Selection Assistance Information (N-SSAI) within a Non-Access Stratum registration request message that will be sent to the overlay network;

based at least on the PLMN identifier and the requested slice information, and based on at least one or more parameters comprising one or more slice mapping rules, determine a slice identifier set comprising at least one slice identifier that identifies at least one respective network slice that is supported by the relay user equipment; and cause transmission of the slice identifier set to the remote user device for use over a relay session to the overlay network.

2. The relay user equipment of claim 1, wherein the computer program code, when executed by the at least one processor, causes the relay user equipment to determine the slice identifier set by:

causing transmission of a second request to an Access and Mobility Management Function (AMF), the second request comprising the PLMN identifier and the requested slice information; and receiving the slice identifier set from the AMF with the slice identifier set being determined based at least on the PLMN identifier and the requested slice information.

3. The relay user equipment of claim 2, wherein the second request comprises a Packet Data Unit (PDU) session establishment request, and wherein the receiving the slice identifier set from the AMF comprises receiving the slice identifier set as part of a PDU session acceptance message.

4. The relay user equipment of claim 2, wherein the second request comprises a Packet Data Unit (PDU) session modification request, and wherein the receiving the slice identifier set from the AMF comprises receiving the slice identifier set as part of a PDU session modification acceptance message.

5. The relay user equipment of claim 2, wherein the second request comprises a dedicated Non-Access Stratum (NAS) message requesting authorization for relaying traffic of the remote user device.

6. The relay user equipment of claim 5, wherein the computer program code, when executed by the at least one processor, causes the relay user equipment at least to:

receive the slice identifier set and a slice identifier and determine, based on the slice identifier set and the slice identifier, a Packet Data Unit (PDU) session to relay the traffic of the remote user device.

7. The relay user equipment of claim 6, wherein determining the PDU session comprises determining one of: a usage of an already established PDU session for the slice identifier, a request for modification of the already established PDU session for the slice identifier, or a request for establishment of the PDU session.

8. The relay user equipment of claim 1, wherein the one or more parameters further comprises at least one of the requested slice information and capabilities of an associated access network.

9. The relay user equipment of claim 1, wherein the one or more slice mapping rules are received from a Policy Control Function (PCF).

10. The relay user equipment of claim 1, wherein the computer program code, when executed by the at least one processor, causes the relay user equipment at least to:

trigger establishment of a PDU session in accordance with the one or more parameters.

11. The relay user equipment of claim 1, wherein the computer program code, when executed by the at least one processor, causes the relay user equipment at least to:

trigger modification of a PDU session in accordance with the one or more parameters.

12. A method of providing a slice identifier set, the method performed by a relay user equipment connected to an underlay network, the method comprising:

receiving a first request from a remote user device, the request comprising a Public Land Mobile Network (PLMN) identifier of a home PLMN of the remote user device and requested slice information comprising a listing of Single Network Slice Selection Assistance Informations (S-NSSAIs) which the remote user device intends to be presented as requested Network Slice Selection Assistance Information (N-SSAI) within a Non-Access Stratum registration request message that will be sent to the overlay network;

based at least on the PLMN identifier and the requested slice information, and based on at least one or more parameters comprising one or more slice mapping rules, determining a slice identifier set comprising at least one slice identifier that identifies at least one respective network slice that is supported by the relay user equipment; and causing transmission of the slice identifier set to the remote user device for use over a relay session to the overlay network.

13. The method of claim 12, wherein determining the slice identifier set further comprises:

causing transmission of a second request to an Access and Mobility Management Function (AMF), the second request comprising the PLMN identifier and the requested slice information; and receiving the slice identifier set from the AMF with the slice identifier set being determined based at least on the PLMN identifier and the requested slice information.

14. The method of claim 13, wherein the second request comprises a dedicated Non-Access Stratum (NAS) message requesting authorization for relaying traffic of the remote user device.

15. The method of claim 12, wherein the one or more slice mapping rules are received from a Policy Control Function (PCF).

16. A remote user equipment comprising: at least one processor; and at least one memory including computer program code, which, when executed by the at least one processor, causes the remote user equipment at least to:

cause transmission of a request to a relay user equipment connected to an overlay network, the request comprising a Public Land Mobile Network (PLMN) identifier of a home PLMN of the remote user equipment and requested slice information comprising a listing of Single Network Slice Selection Assistance Informations (S-NSSAIs) which the remote user equipment intends to be presented as requested Network Slice Selection Assistance Information (N-SSAI) within a Non-Access Stratum registration request message that will be sent to the overlay network; and receive, from the relay user equipment, a slice identifier set for use by the remote user equipment over a relay session to the overlay network, wherein the slice identifier set comprises at least one slice identifier that identifies at least one respective network slice that is supported by the relay user equipment and wherein the slice identifier set is determined by the relay user equipment based on the PLMN identifier, the requested slice information and at least one or more parameters comprising one or more slice mapping rules.

17. The remote user equipment of claim 16, wherein the computer program code, when executed by the at least one processor, further causes the remote user equipment at least to:

generate, using the slice identifier set, a slice request to register to a network over a connection supported by the relay user equipment.

18. A method of obtaining a slice identifier set, the method performed by a remote user equipment, the method comprising:

causing transmission of a request to a relay user equipment connected to an overlay network, the request comprising a Public Land Mobile Network (PLMN) identifier of a home PLMN of the remote user equipment and requested slice information comprising a listing of Single Network Slice Selection Assistance Informations (S-NSSAIs) which the remote user equipment intends to be presented as requested Network Slice Selection Assistance Information (N-SSAI) within a Non-Access Stratum registration request message that will be sent to the overlay network; and receiving, from the relay user equipment, the slice identifier set for use by the remote user equipment over a relay session to the overlay network, wherein the slice identifier set comprises at least one slice identifier that identifies at least one respective network slice that is supported by the relay user equipment and wherein the slice identifier set is determined by the relay user equipment based on the PLMN identifier, the requested slice information and at least one or more parameters comprising one or more slice mapping rules.

* * * * *